(12) United States Patent  
Bell

(10) Patent No.: US 6,501,490 B1
(45) Date of Patent: Dec. 31, 2002

(54) SYSTEM AND METHOD FOR GENERATING A FAMILY OF ICONS

(75) Inventor: Mark A Bell, Ft. Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/428,166

(22) Filed: Oct. 27, 1999

(51) Int. Cl.$^7$ ................................................. G09G 5/00
(52) U.S. Cl. ........................ 345/837; 345/763; 345/619
(58) Field of Search ................................ 345/762, 763, 345/835, 836, 837, 838, 581, 588, 619, 441, 810

(56) References Cited

U.S. PATENT DOCUMENTS

| 5,367,626 A | * 11/1994 | Morioka et al. | ............ 345/837 |
| 5,680,558 A | * 10/1997 | Hatanaka et al. | ........... 345/838 |
| 5,689,286 A | * 11/1997 | Wugofski | .................... 345/835 |
| 6,031,532 A | 2/2000 | Gourdol et al. | ............. 345/348 |

OTHER PUBLICATIONS

IconEdit Pro [32–bit] Full Install v6.0,Browse and edit icons, cursors, Jan. 26, 1999 [online], Retrieved from the Internet <URl: http://www.iconedit.com/home.htm> [re-

*Primary Examiner*—Raymond J. Bayerl
*Assistant Examiner*—Tadesse Hailu

(57) ABSTRACT

A system and method are provided for efficiently generating a number of icons. The system includes a computer system having a processor electrically coupled to a local interface and a memory electrically coupled to the local interface. The computer system is employed to execute a software application that includes imaging logic. The imaging logic is, therefore, stored on the memory and executed by the processor. The imaging logic preferably includes modified image encoding logic to generate at least one modified raw icon from a base image object. The base image object includes at least one first indicator region filled with a first indicator color, and the modified raw icon(s) include at least one second indicator region filled with a second indicator color. The shape of the second indicator region corresponds to or is identical to a shape of the at least one first indicator region. One or more modified image objects may be generated from the one or more modified raw icons, the base and modified image objects being employed to generate the family of icons for use in a graphical user interface.

19 Claims, 4 Drawing Sheets

SYSTEM AND METHOD FOR GENERATING A FAMILY OF ICONS

TECHNICAL FIELD

The present invention is generally related to the field of graphical user interfaces (GUIs) and, more particularly, is related to a system and method for generating a family of icons used in graphical user interfaces.

BACKGROUND OF THE INVENTION

Computer technology is now accessible by the general public for a myriad of applications. Given that the vast majority of computer users are not technologically sophisticated, software companies and other entities that generate computer software employ various graphical user interfaces that make computer applications simple to use. Often these graphical user interfaces employ specific icons that include pictorial depictions of functionality, etc. associated therewith.

The software applications generated are becoming more and more complex. Often a user may execute or generally manipulate a multitude of functions, events, states, or properties, etc., in a single software application. Each of these functions, events, states, or properties may be associated with a single icon on one or more graphical user interfaces. Oftentimes, the functionality, events, states, or other properties may be related in some way, depending upon the particular software application.

For such related functions, events, states, or properties, it may be desirable to create a family of icons that have a similar appearance depending upon the nature of the relationship between the particular functions, events, states, or properties, etc. Each icon is stored in memory and is later accessed to display on a display device, etc. Unfortunately, this may require significant quantities of memory to store the various icons that are to be employed.

SUMMARY OF THE INVENTION

In light of the foregoing, the present invention provides for a system and method for efficiently generating a number of different icons. In one embodiment, the present system includes a computer system having a processor electrically coupled to a local interface and a memory electrically coupled to the local interface. The computer system is employed to execute a software application that includes imaging logic. The imaging logic is, therefore, stored on the memory and executed by the processor.

The imaging logic advantageously generates a family of icons to represent a number of functions, events, states, or properties, etc., where the family of icons is generated using a single base raw icon preferably stored in a nonvolatile component of the memory, although it may be stored in a volatile component as well. The base raw icon is accessed from the memory and a base image object is generated therefrom. The base image object generally includes the data and functionality to generate a corresponding base icon on a display device in the computer system, etc.

The imaging logic preferably includes modified image encoding logic to generate at least one modified raw icon from the base image object. The base image object includes at least one first indicator region filled with a first indicator color, and the modified raw icon(s) include at least one second indicator region filled with a second indicator color. The shape of the second indicator region corresponds to or is identical to a shape of the at least one first indicator region. One or more modified image objects may be generated from the one or more modified raw icons, thereby resulting in the family of icons that may be employed in a graphical user interface accordingly.

In another embodiment, the present invention may be viewed as a method for generating a number of icons. Broadly stated, the present method may comprise the step of generating at least one modified raw icon from a base image object, the base image object having at least one first indicator region filled with a first indicator color, and the at least one modified raw icon having at least one second indicator region filled with a second indicator color. The shape of the second indicator region corresponds to or is identical to a shape of the first indicator region.

Other features and advantages of the present invention will become apparent to one with skill in the art upon examination of the following drawings and detailed description. It is intended that all such additional features and advantages be included herein within the scope of the present invention.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
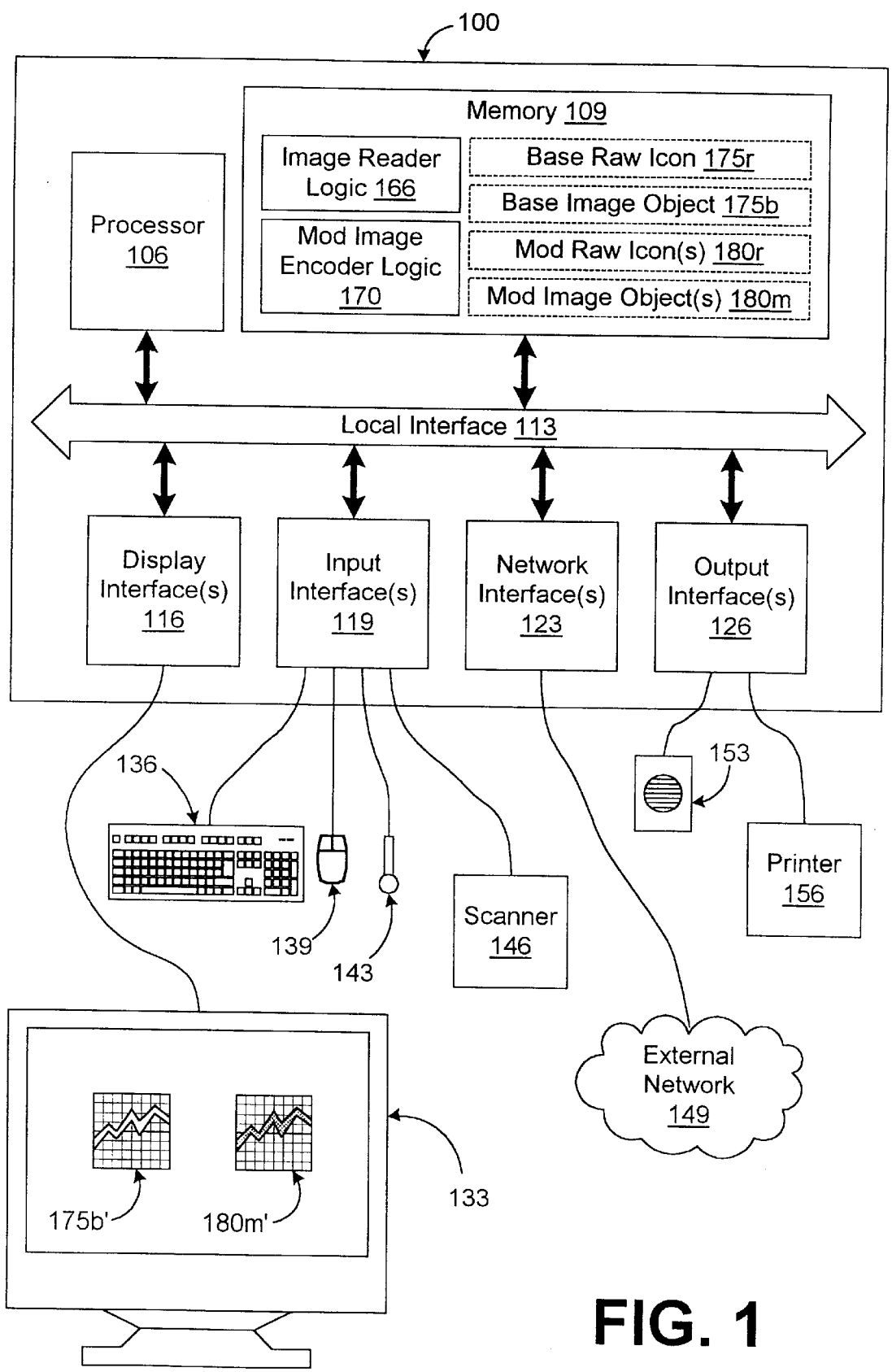
FIG. 1 is a block diagram of a computer system according to an embodiment of the present invention.

With reference to FIG. 1, shown is a computer system 100 according to an embodiment of the present invention. The computer system 100 includes a processor 106 and a memory 109, both of which are electrically coupled to a local interface 113. The local interface 113 may comprise, for example, one or more data buses with one or more accompanying control buses as is known in the art. The computer system 100 also includes a number of components that are also electrically coupled to the local interface 113, such as display interface(s) 116, input interface(s) 119, network interface(s) 123, and output interface(s) 126. The various interfaces 116, 119, 123, and 126 link one or more peripheral devices or networks through the local interface 113 to the local interface 1 13.

The memory 109 may comprise one or more memory components that may include both volatile and nonvolatile memory components. Volatile components are those that do not retain data values upon loss of power. Conversely, nonvolatile components retain data upon a loss of power. The memory 113 may include, for example, random access memory (RAM), read-only memory (ROM), hard disk drives, floppy disk drives, compact disk drives, tape drives, and other memory components.

The computer system 100 also includes a display device 133 that is electrically coupled to the local interface 113 through the display interface(s) 116 as shown. The display device 133 may include, for example, a cathode ray tube (CRT), a liquid crystal display screen, a gas plasma-based flat panel display, indicator lights, light emitting diodes (LEDs), and other display devices.

The computer system 100 may include any of a number of input devices such as a keyboard 136, a mouse 139, a microphone 143, or a scanner 146, etc. The keyboard 136, mouse 139, microphone 143, and scanner 146 provide data input to the local interface 113 through the various input interfaces 119 as shown, thereby making the data accessible to the processor 106, etc. The computer system 100 may also be linked to one or more external networks 149 through the network interface(s) 123. The external network 149 may comprise, for example, the Internet or other similar networks. Finally, the computer system 100 may include one or more output devices such as, for example, speakers 153 and a printer 156. Note that the speakers 153 and the printer 156 receive data from the local interface 113 through the output interface(s) 126.

The imaging system 100 also includes image reader logic 166 and modified image encoder logic 170 that are stored on the memory 109 and executed by the processor 106. Also stored in the memory 109 are a base raw icon 175r, a base image object 175b, one or more modified raw icon(s) 180r, and one or more modified image object(s) 180m. The image reader logic 166 preferably is comprised of an object that generally converts the base raw icon 175r and the modified raw icon(s) 180r into the base image object 175b and the modified image object(s) 180m. According to an embodiment of the present invention, the modified image encoder logic 170 generates one or more of the modified raw icons 180r from the base image object 175b. The base image object 175b and the modified image object(s) 180m cause a respective base icon 175b' and one or more modified icon(s) 180m' to be displayed on the display device 133 as will be discussed.

Figure 2A:
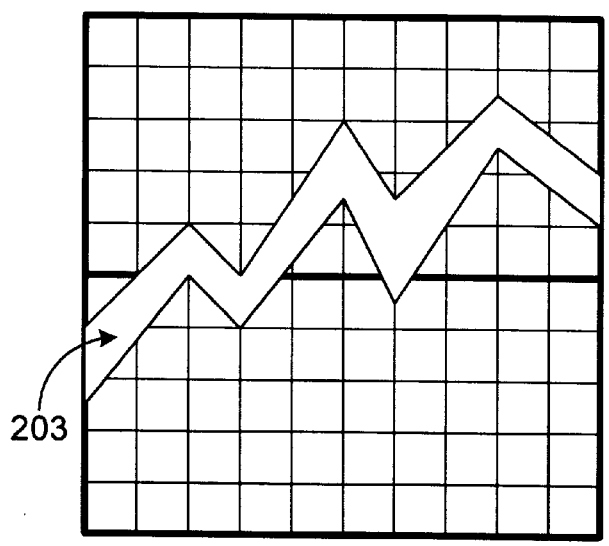
FIGS. 2A and 2B are drawings of base and modified icons generated on a display device of the computer system of FIG. 1.
Figure 2B:
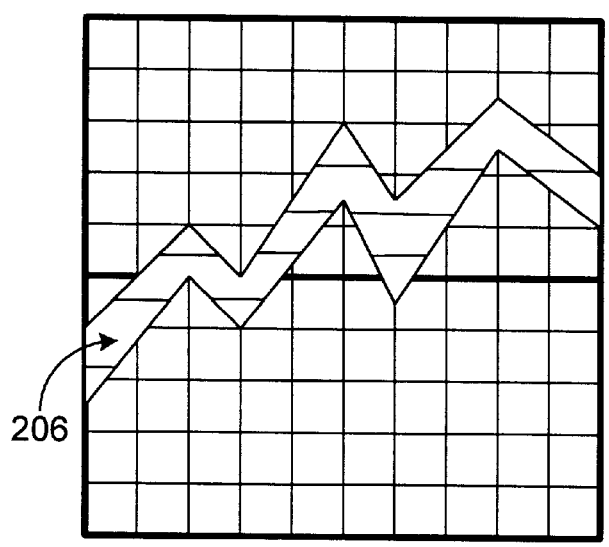

Turning then, to FIGS. 2A and 2B, shown are the base icon 175b' and a single modified icon 180m' according to an embodiment of the present invention. The base and modified icons 175b'0 and 180m' are generally created using various graphical arts techniques as known by those skilled in the art. The icons 175b' and 180m' may be employed in a particular software application operated by the computer system 100 to indicate an event, status, property, state, or other feature of a particular system. For example, the icon 175b' may be associated with certain functionality of a particular computer software application whereas the modified icon 180m' may be associated with a different function of the same software application.

The base icon 175b' includes a base indicator region 203. The base indicator region 203 is not limited to any particular shape or design, etc. Also, the base indicator region 203 may actually comprise a number of regions in the base icon 175b'. The base indicator region 203 is used to associate the base icon 175b' with a particular feature of a software application. The base indicator region 203 of the base icon 175b' is filled in with a base color that is application specific, depending upon the particular purpose for which the base icon 175b' is used.

The modified icon 180m' appears substantially similar to the base icon 175b' except the modified icon 180m' includes a modified indicator region 206. The modified indicator region 206 corresponds with or is identical to the shape of the base indicator region 203. However, the base and modified indicator regions 203 and 206 differ in that the color of the modified indicator region 106 is different than the base indicator color. The difference in color between the base and modified indicator regions 203 and 206 allow the base and modified icons 175b' and 180m' to be employed to indicate various permutations of functionality in a software application, etc. This can be done without the necessity of having to include a separate individual icon that is stored in the memory 109 for each functional permutation as will be discussed.

Figure 3:
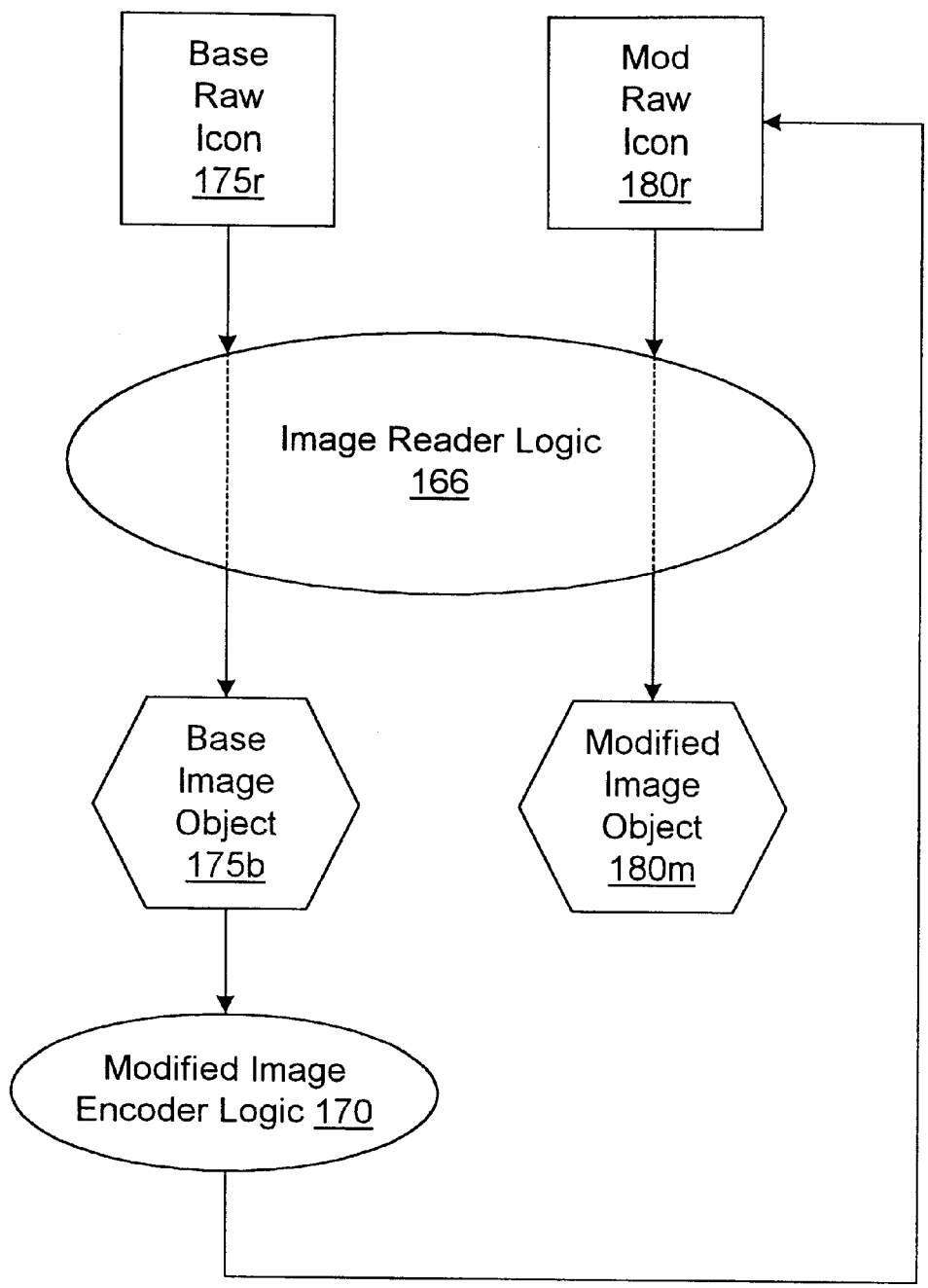
FIG. 3 is a functional block diagram of the operation of the computer system of FIG. 1 in generating the base and modified icons of FIGS. 2A and 2B.

Turning then to FIG. 3, next the operation of the image reader logic 166 and the modified image encoder logic 170 is described. The computer system 100 (FIG. 1) may be employed to execute a particular software application. During the course of the operation of the software application, it may become necessary to display one or more icons in a graphical user interface (GUI) on the display device 133 (FIG. 1) to aid in the manipulation of the particular application by a user. According to the present invention, a family of icons may be desired to show a number of different permutations of user selection of particular functionality or features of the specific software application as previously discussed. The various embodiments of the present invention advantageously allow the creation of a family of icons from a single base raw icon 175r that is stored on a nonvolatile memory component included in the memory 109 (FIG. 1).

The desired family of icons includes the base icon 175b' (FIG. 2A) plus one or more modified icons 180m' (FIG. 2B). While the base icon 175b' includes the base indicator region 203 (FIG. 2A) filled with the base indicator color, the modified icons 180m' each include the modified indicator region 206 (FIG. 2B) having a unique color specific to that particular modified icon 180m'. It is a significant advantage of the present invention that only the base raw icon 175r need be saved in nonvolatile memory and the family of icons may still be generated therefrom.

The image reader logic 166 is generally comprised of a particular object in a software application executed on the computer system 100. In order to generate the family of icons, the image reader logic 166 accesses the base raw icon 175r in the memory 109 and generates a base image object 175b therefrom. The base image object 175b generally includes the data and functionality to generate the base icon 175b' on the display device 133, or other output devices such as the printer 156 (FIG. 1), etc. The particular nature of the data and functionality of the base image object 175b is generally known to those skilled in the art and is not discussed herein in detail.

The modified image encoder logic 170 is also an object within the particular software application executed by the computer system 100. To generate one or more of the modified icons 180m' employed by the particular software, application, the modified image encoder logic 170 accesses the base image object 175b and generates a modified raw icon 180r therefrom, storing the modified raw icon 180r in the memory 109. The modified raw icon 180r may then be applied to the image reader logic 166 to generate a modified image object 180m. The modified image object 180m generally includes the data and functionality to generate the modified icon 180m' on the display device 133, or other output devices such as the printer 156, etc., similar to the base image object 175b. The base image object 175b, modified raw icons 180r, and modified image objects 180m are preferably stored on volatile memory and as such, do not take up extra storage space on the nonvolatile memory with the base raw icon 175r.

Figure 4:
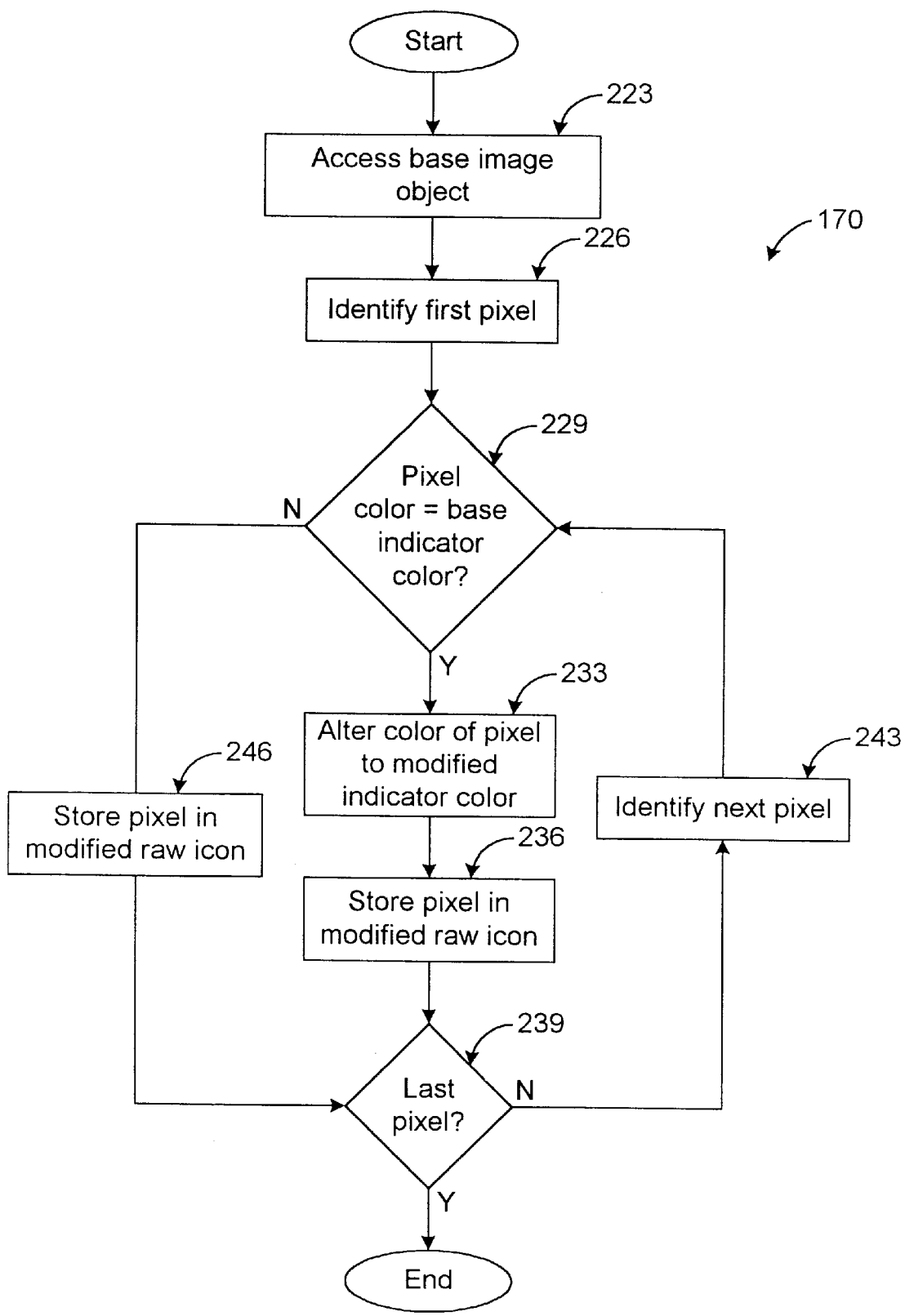
FIG. 4 is a flow chart of modified image encoder logic executed in the computer system of FIG. 1.

Turning then to FIG. 4, shown is a flow chart of the modified image encoder logic 170 according to an embodiment of the present invention. The modified image encoder logic 170 is preferably employed to generate one or more modified raw icons 180r (FIG. 1) from a particular base image object 175b (FIG. 1). In particular, the one or more modified raw icons 180r are generated using a different color in the respective modified indicator region 206 (FIG. 2B). This allows the particular modified icon 180m generated therefrom to be employed to indicate a different entity or functionality of the software system set apart from that indicated by the base icon 175b' (FIG. 1).

Beginning with block 223, the modified image encoder logic 170 accesses the base image object 175b stored in the memory 109 to generate a modified raw icon 180r therefrom. Thereafter in block 226, a first pixel of a base icon 175b' generated from the base image object 175b is identified. Thereafter, in block 229, the color of the pixel identified is examined to see if it is the same as the base indicator color of the base indicator region 203. If such is the case, then the modified image encoder logic 170 progresses to block 233 in which the color of the pixel in question is modified to a color of the respective modified indicator region 206 of the modified raw icon 180r from which a modified icon 180m' is to be generated. Thereafter, in block 236, the same pixel is then stored in memory as part of the modified raw icon 180r.

In block 239, it is determined whether the last pixel of the base icon 175b' has been accessed and subjected to the comparison of block 229. If such is the case, then the modified image encoder logic 170 ends appropriately. On the other hand, if not, then the modified image encoder logic 170 moves to block 243 in which the next pixel in the base icon 175b' is identified. Thereafter, the modified image encoder logic 170 reverts back to block 229 in which the color of the particular pixel identified is once again compared with the base indicator color as discussed previously.

If, in block 229, the particular color of a pixel examined does not equal the base indicator color, then the modified image encoder logic 170 moves to block 246 in which the pixel is simply stored in memory 109 as part of the modified raw icon 180r. This is because the pixel in question falls outside of the indicator region 203 and, therefore, its color should not be changed accordingly. Thereafter, the modified image encoder logic 170 progresses to block 239, the functionality of which has been discussed previously.

In addition to the foregoing discussion, the logic 170 of the present invention can be implemented in hardware, software, firmware, or a combination thereof. In the preferred embodiment(s), the logic 170 is implemented in software or firmware that is stored in a memory and that is executed by a suitable instruction execution system. If implemented in hardware, as in an alternative embodiment, the logic 170 can implemented with any or a combination of the following technologies, which are all well known in the art: a discrete logic circuit(s) having logic gates for implementing logic fimctions upon data signals, an application specific integrated circuit having appropriate logic gates, a programmable gate array(s) (PGA), a field programmable gate array (FPGA), etc.

Also, the flow chart of FIG. 4 shows the architecture, functionality, and operation of a possible implementation of the logic 170. In this regard, each block represents a module, segment, or portion of code, which comprises one or more executable instructions for implementing the specified logical function(s). It should also be noted that in some alternative implementations, the functions noted in the blocks may occur out of the order noted in FIG. 4. For example, two blocks shown in succession in FIG. 4 may in fact be executed substantially concurrently or the blocks may sometimes be executed in the reverse order, depending upon the functionality involved.

Finally, the logic 170, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a readonly memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Many variations and modifications may be made to the above-described embodiment(s) of the invention without departing substantially from the spirit and principles of the invention. All such modifications and variations are intended to be included herein within the scope of the present invention.

What is claimed is:

1. A method for generating a number of icons comprising:

providing volatile memory;

providing a raw image icon including an indicator region;

providing a base image object including data for generating a first icon from the raw image icon such that the first icon includes a first indicator region of a first color, the first indicator region exhibiting a shape corresponding to a shape of the indicator region of the raw image icon;

automatically generating data corresponding to the first icon using the raw image icon and the base image object;

automatically generating data corresponding to a second icon using the raw image icon and the base image object, the second icon including a second indicator region associated with a second indicator color, the second indicator color being different than the first indicator color, a shape of the second indicator region corresponding to a shape of the first indicator region; and automatically storing the data corresponding to the first icon and the second icon in the volatile memory.

2. The method of claim 1, wherein the first icon corresponds to at least one of a first function, a first event, a first state, and a first property; and further comprising:

providing a display device; and automatically displaying the first icon on the display device in response to the at least one of the first function, the first event, the first state, and the first property occurring.

3. The method of claim 2, wherein the second icon corresponds to at least one of a second function, a second event, a second state, and a second property; and further comprising:

automatically displaying the second icon on the display device in response to the at least one of the second function, the second event, the second state, and the second property occurring.

4. The method of claim 1, further comprising:

providing non-volatile memory; and storing the raw image icon in the non-volatile memory.

5. The method of claim 4, wherein, in automatically storing the data corresponding to the first icon and the second icon in the volatile memory, the data corresponding to the first icon and the second icon are not stored in the non-volatile memory.

6. The method of claim 1, wherein providing a raw image icon comprises:

creating the raw image icon using a software application.

7. The method of claim 1, wherein, in automatically generating data corresponding to the first icon, the base image object facilitates identification of the indicator region of the raw image icon by evaluating colors of pixels of the raw image icon.

8. A system for generating a number of icons, comprising:

a processor electrically coupled to a local interface;

a memory electrically coupled to the local interface; and imaging logic stored on the memory and executed by the processor, the imaging logic including:

logic configured to receive data corresponding to a raw image icon, the raw image icon including an indicator region;

logic configured to automatically generate data corresponding to a first icon using the raw image icon such that the first icon includes a first indicator region associated with a first color, the first indicator region exhibiting a shape corresponding to a shape of the indicator region of the raw image icon;

logic configured to automatically generate data corresponding to a second icon using the raw image icon, the second icon including a second indicator region associated with a second indicator color, the second indicator color being different than the first indicator color, a shape of the second indicator region corresponding to a shape of the first indicator region; and logic configured to automatically store the data corresponding to the first icon and the second icon in the memory.

9. The system of claim 8, wherein the memory includes volatile memory; and wherein the logic configured to automatically store the data corresponding to the first icon and the second icon is operative to store the data in the volatile memory.

10. The system of claim 8, wherein the first icon corresponds to at least one of a first function, a first event, a first state, and a first property; and further comprising:

a display device electrically coupled to the local interface; and means for automatically displaying the first icon on the display device in response to the at least one of the first function, the first event, the first state, and the first property occurring.

11. The system of claim 8, wherein the first icon corresponds to at least one of a first function, a first event, a first state, and a first property; and further comprising:

a display device electrically coupled to the local interface; and logic configured to automatically display the first icon on the display device in response to the at least one of the first function, the first event, the first state, and the first property occurring.

12. The system of claim 11, wherein the second icon corresponds to at least one of a second function, a second event, a second state, and a second property; and further comprising:

logic configured to automatically display the second icon on the display device in response to the at least one of the second function, the second event, the second state, and the second property occurring.

13. The method of claim 8, further comprising:

providing non-volatile memory; and storing the raw image icon in the non-volatile memory.

14. The system of claim 8, wherein the memory includes non-volatile memory; and wherein, the logic configured to automatically store the data corresponding to the first icon and the second icon in the memory does not store the data corresponding to the first icon and the second icon in the non-volatile memory.

15. The system of claim 8, wherein the logic configured to automatically generate data corresponding to a first icon includes logic configured to identify the indicator region of the raw image icon by evaluating colors of pixels of the raw image icon.

16. A computer-readable medium having a computer program for generating a number of icons comprising:

logic configured to receive data corresponding to a raw image icon, the raw image icon including an indicator region;

logic configured to automatically generate data corresponding to a first icon using the raw image icon such that the first icon includes a first indicator region associated with a first color, the first indicator region exhibiting a shape corresponding to a shape of the indicator region of the raw image icon;

logic configured to automatically generate data corresponding to a second icon using the raw image icon, the second icon including a second indicator region associated with a second indicator color, the second indicator color being different than the first indicator color, a shape of the second indicator region corresponding to a shape of the first indicator region; and logic configured to automatically store the data corresponding to the first icon and the second icon in the memory.

17. The computer-readable medium of claim 16, wherein the first icon corresponds to at least one of a first function, a first event, a first state, and a first property; and further comprising:

logic configured to automatically display the first icon on a display device in response to the at least one of the first function, the first event, the first state, and the first property occurring.

18. The computer-readable medium of claim 17, wherein the second icon corresponds to at least one of a second function, a second event, a second state, and a second property; and further comprising:
logic configured to automatically display the second icon on a display device in response to the at least one of the second function, the second event, the second state, and the second property occurring.

19. The computer-readable medium of claim 16, wherein the logic configured to automatically generate data corresponding to a first icon includes logic configured to identify the indicator region of the raw image icon by evaluating colors of pixels of the raw image icon.

\* \* \* \* \*